United States Patent [19]

Popp et al.

[11] 3,725,334
[45] Apr. 3, 1973

[54] PHENOLIC RESIN-ISOCYANATE TRIMERIZATION PRODUCT AND FRICTION MATERIAL CONTAINING THE SAME

[75] Inventors: Franz Popp, Hamburg-Kirchwerder; Wilfried Augustin, Reinbek, both of Germany

[73] Assignee: Jurid Werke GmbH, Hamburg, Germany

[22] Filed: May 18, 1970

[21] Appl. No.: 38,074

[30] Foreign Application Priority Data

May 29, 1969 Germany..................P 19 27 254.9
May 29, 1969 Germany..................P 19 27 255.0

[52] U.S. Cl..................260/38, 106/36, 260/45.8 N, 260/51 R, 260/845, 260/DIG. 39
[51] Int. Cl..........................C08g 51/12, C09k 3/14
[58] Field of Search..................260/3, 38, 45.8 N, 260/845, DIG. 39, 45.9 R; 106/36

[56] References Cited

UNITED STATES PATENTS

| | | | |
|---|---|---|---|
| 3,344,094 | 9/1967 | De Gaugue | 260/5 |
| 2,848,436 | 8/1958 | Christenson | 260/53 |
| 3,448,071 | 6/1969 | Keller | 260/38 |
| 3,330,828 | 7/1967 | Grogler et al. | 260/248 |

Primary Examiner—Donald E. Czaja
Assistant Examiner—R. A. White
Attorney—Young & Thompson

[57] ABSTRACT

At least one isocyanurate derivative is added to polymer or polymer mixtures as a stabilizing agent, preferably prior to molding and setting the blend. The isocyanurate derivative may be added in the form of an emulsion or dispersion in a liquid vehicle. An improved friction material contains an isocyanate derivative and a trimerization catalyst acting to react said isocyanate to said isocyanurate, in admixture with an organic binding agent comprising a phenolic resin and inorganic or organic fillers and, if desired, a natural or synthetic rubber.

7 Claims, No Drawings

PHENOLIC RESIN-ISOCYANATE TRIMERIZATION PRODUCT AND FRICTION MATERIAL CONTAINING THE SAME

BACKGROUND OF THE INVENTION

As is known, various polymers, particularly those which contain ester and urethane groups, are stabilized by means of carbo-di-imides against energy-initiated decomposition, in particular, thermo-oxidative disintegration and/or decomposition by light. However, this has not been possible up to now with phenoplasts, i.e., phenolic resins. Carbo-di-imides cannot be used for this purpose because, owing to their high reactivity, they react with the phenolic resins before hardening whilst the latter are subjected to molding.

The invention is based on the problem of removing the disadvantages which have arisen in the past and of providing a method for effecting the stabilization of polymers containing phenolic resins.

SUMMARY OF THE INVENTION

The invention relates in general to stabilizing of phenolic resin-containing products produced by pressing, rolling, extrusion, injection-molding, backfilling or adhesion, and in particular to an improved product produced by adding to the polymer mixture, as a stabilizing agent, at least one isocyanurate compound of the general formula:

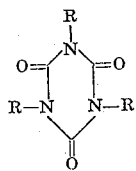

wherein R represents a substituted or modified or unsubstituted hydrocarbon radical, preferably an aryl radical.

This isocyanurate compound is added to the polymer mixture before molding and/or setting and hardening. With the method according to the invention, any phenolic resin-containing polymer mixture can be used, but preferably one in which the phenolic materials are combined with natural and/or synthetic rubbers. The polymer mixture can also contain the usual fillers and/or pigments. The isocyanurate compound can be employed in solid or liquid form, the example as an emulsion or dispersion, depending upon the purpose of use and type of processing of the polymer mixture which is to be stabilized with the stabilizing agent according to the invention.

It is known that isocyanurate ring systems represent cross-linked structures which cannot be split into their basic molecules, the isocyanates, but under certain conditions e.g. at increased temperature, for example 250° to 350°C., they decompose into carbo-di-imides of the general formula:

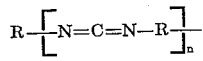

and $CO_2$. The thermo-oxidative decomposition of phenolic resins also begins at temperatures in the range of 250° to 350°C.

It has now surprisingly been found that this thermo-oxidative decomposition of phenolic resins is minimized and, if required, practically completely removed if these resins are subjected to the effect of such higher temperatures in the presence of the isocyanurate-compounds mentioned above. It is to be assumed that the carbo-di-imides resulting from the isocyanurates at these temperatures immediately react again with the reactive products which cause the decomposition of the phenolic resins, whereby the decomposition or further decomposition of the latter is prevented and decomposed cross-linkage sites are reconnected.

With the method according to the invention, the isocyanurates used desirably are those which are obtained by means of suitable catalytic action from isocyanates, preferably polyisocyanates. The catalysts may be: tertiary arylamines, e.g. 2,4,6-tri-(dimethylaminoethyl)-phenol, 2-(dimethylaminoethyl)-phenol, 4-(dimethylaminoethyl)-phenol, bisphenol-A-diglycidylether, vinylcyclohexane-epoxide and N,N',N''tri-(dimethylaminopropyl)-hexahydrotriazine. In addition, metallo-organic salts, for example calcium naphthenate, phenolate, sodium ethylate, formate, potassium acetate or even sodium carbonate, may be used as the catalysts in the manufacture of the isocyanurate-compounds which are used according to the invention.

The following may be considered as suitable isocyanates for obtaining the isocyanurates which are used according to the invention: toluylene-2,4-diisocyanate, toluylene-2,6-diisocyanate, diphenylmethane-4,4'-diisocyanate, dimerized toluylene-2,4-diisocyanate, naphthylene-1,5-diisocyanate, triphenylmethane-4,4',4''-triisocyanate, hexamethylene-1,6-diisocyanate, methylisocyanate, n-butylisocyanate, cyclohexylisocyanate, isophorone-diisocyanate, m-phenylenediisocyanate, octadecyldiisocyanate, 3,4-dichlorophenylisocyanate, p-chlorophenylisocyanate, polymethylenepolyphenylisocyanate, fluoralkylisocyanate, sulfonylisocyanates, organophospho-isocyanates, alkylsiliconisocyanates, trialkylmetalisocyanates, ferrocenylisocyanate, as well as their derivatives and modified isocyanates and prepolymers with at least two free NCO groups.

All known phenolic resins which are obtained by a condensation reaction between formaldehyde and a phenol, for example phenol or o-cresol, m-cresol and p-cresol, can be used, thus including Novolaks and Resols, Resitols and Resits. Satisfactory stabilizing results are obtained in polymer mixtures in which the phenolic resins are present in combination with natural or synthetic polymers, such as acrylonitrile-butadiene-copolymers, polyethylene-polypropylene-polymers, polychloroprenecopolymers, styrene-butadiene-copolymers and the like.

The stabilizing effect attained with the method according to the invention can, as has been found, be achieved with the same favorable effect, if the phenolic resins are present with other substances, in particular with pigments and fillers.

The phenolic resins stabilized according to the invention can be molded into shaped articles in the usual way pressing, rolling, extrusion, injection-molding, backfilling or adhesion in the cold or under increased temperatures. Mixing of the isocyanurate stabilizing agent as uniformly as possible with the molding mix before molding occurs ensures optimum working properties. With the method according to the invention, the phenolic resin-containing polymeric materials can be treated by impregnating with solutions or emulsions or dispersions of the isocyanurate-compounds which are to be used as the stabilizing agent.

The phenolic resin-containing polymeric molding materials stabilized according to the method of the invention can be used for the production of thermally or otherwise stressed articles, such as cable pulley linings, grinding wheels, grinding belts, friction bearings, insulating plates, stop plates, linings, and the like as well as rolled materials and as binding materials, which are thermally loaded in use. They have increased thermal stability, compared with corresponding molded articles which are unstabilized, and also show correspondingly improved working qualities.

It has now been found, with the aid of the invention, that friction materials containing phenolic resins are obtained with improved thermal stability, resistance to wear and elasticity properties. New friction materials according to the invention have an isocyanate-compound which is pre-polymerized with a trimerization catalyst. The friction materials according to the invention consist of fillers which serve as the friction bearers and additives which supply the necessary friction and/or anti-friction properties and contain as the binding agent, phenolic resins and in addition the isocyanate-compound which has been pre-polymerized with a trimerization catalyst and, if desired, a natural or synthetic rubber. This pre-polymerized isocyanate-compound is preferably present in the new friction material in a proportion of trimerization product to phenolic resin in the weight range from 1:1 to 1:10.

The new friction material according to the invention has, in comparison with the known organic friction materials, essentially improved heat resistance and wear, corrosion and elasticity are quite substantially improved without any technical difficulties occuring in production.

A particularly advantageous friction material according to the invention contains a trimerization product of diphenylmethane-diisocyanate as the isocyanate-compound, which is prepolymerized with 2,4,6-tri-(dimethylaminoethyl)-phenol as the catalyst, for example by the method of U.S. Pat. No. 3,284,413. The structure of this trimerization product can be represented as:

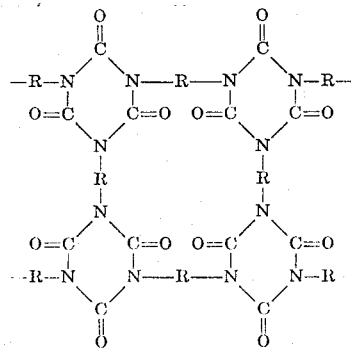

wherein R is

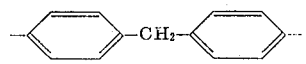

Very uniform results can also be obtained if the trimerization product contained in the friction material according to the invention is produced with a commercially available mixture of tertiary phenolic amines as the catalyst.

The fillers serving as the friction bearers in the friction materials according to the invention are for example inorganic fibers, such as asbestos, mineral wool and slag wool, and/or metal oxides, such as zinc oxide and magnesium oxide, and/or metal salts, such as barium sulphate, silicate and carbonate, and/or metals such as iron particles and the like, such as are also used in the known friction materials. Similarly, the customary and known materials, for example graphite, metal sulphides, organic friction materials, abrasives such as corundum and the like are used in the friction materials according to the invention as the additives which supply the friction and/or anti-friction properties.

All known phenolic resins which are obtained by a condensation reaction between formaldehyde and a phenol, such as those already mentioned can be used in the friction materials according to the invention to form the binding agent for the other components. Also the fillers serving as the friction carrier, and the additives supplying the friction and/or anti-friction properties which are contained in the friction material according to the invention, do not differ from the substances which are already known for these purposes so that no further details need be mentioned in this connection.

The manufacture of the friction materials according to the invention take place in practically the same way as for known friction materials. Thus the constituents can be mixed in the usual mixing devices, then pressed under pressures in the range from 100 to 800 kp/cm² either hot or cold (at temperatures in the range from 80° to 200°C.) and finally hardened for several hours, preferably about 8 to 12 hours at temperatures in the range from 80° to 300°C. The friction materials obtained after hardening and cooling are ready for use.

However, the friction materials according to the invention can also be produced by impregnating fibrous materials with solutions or suspensions of the binding agent and additives according to the invention.

With the friction materials according to the invention, the thermal stability is increased so much that this friction material is sufficient in trucks and freight cars for a highly-stressed coupling or brake lining or disc-brake lining, without this improved thermal stability being present at the expense of the elasticity which is particularly critical in brake drum linings because then the construction of the lining surface is otherwise no longer guaranteed. Moreover the improvement in the thermal stability can be achieved without the addition of any such fillers, which in the friction materials cause a counter-attack on the anti-friction area. The technical progress achieved with the new friction materials results from improved thermal stability, abrasion and elasticity properties at higher temperatures and under relatively high surface pressures without any adverse effect.

Embodiments of the invention will now be described in the following Examples, whereby usual comparable compositions and their best values are compared with the products produced according to the invention. The percentages and other amounts are given in percents by weight and parts by weight, unless stated otherwise. Examples 3 to 5 illustrate compositions for the friction materials according to the invention and the test values thereof and compare them with the friction materials formed without the additives according to the invention.

EXAMPLE 1

An abrasive material was produced from the following constituents:

| | |
|---|---|
| Phenol-Novolak-Hexa-mixture | 12.68% |
| Heavy barium sulphate | 5.91% |
| Corundum, particle size 46 | 51.13% |
| Corundem, particle size 80 | 11.54% |
| Corundum, particle size 180 | 11.33% |
| Isocyanurate compound+ | 3.28% |

+The isocyanurate-compound was a trimerization product of 4,4'-diphenylmethane-diisocyanate, catalysed with 2,4,6-tri-(dimethylaminoethyl)-phenol.

These constituents were thoroughly mixed together in an open mixer. Grinding wheels of 200 × 20 × 30 mm were pressed cold at 600 kp/cm$^2$ from the material obtained in the mixer. The pressed shaped articles were dried at 60° to 80°C. and then hardened at temperatures rising to 200°C. Examination showed that the stabilized products according to the invention had excellent abrasive properties.

For comparison, grinding wheels were produced in the same way and from the same constituents, but without the isocyanurate which was used above as the stabilizing agent in accordance with the invention. The results indicated in Table I show that with increasing contact pressure and increasing number of revolutions, the abrasion is considerably more advantageous with the grinding wheels produced according to the invention.

TABLE I

| | Comparison of the material abrasion (in cm$^3$) with the disc abrasion (in cm$^3$) on structural steel St 52 | |
|---|---|---|
| | Product stabilized according to the invention | Comparative product |
| Contact pressure | | |
| 2.0 kp | 2.9 | 2.6 |
| 3.0 kp | 3.1 | 2.5 |
| 4.0 kp | 3.6 | 2.1 |
| 4.5 kp | 3.5 | 1.9 |
| 5.0 kp | 3.4 | 1.5 |
| Number of revolutions | | |
| 2000 rpm | 4.0 | 4.4 |
| 2500 rpm | 4.5 | 4.5 |
| 3000 rpm | 4.8 | 4.4 |
| 3500 | 4.8 | 4.1 |
| 4000 rpm | 4.7 | 3.6 |
| 4500 rpm | 4.7 | 2.8 |

EXAMPLE 2

A normal commercial brake lining adhesive, whose main component is a phenol-formaldehyde resin, was used to stick a commercial disc-brake lining on a lining support of steel. The adhesion was carried out in the usual way and hardened with pressure at 200°C. This ingredient which was termed Ingredient A, contained the commercial adhesive in the unaltered state. In a parallel experiment, a further ingredient, termed Ingredient B, was prepared, namely a mixture of the usual adhesive, as used for Ingredient A, with 5 percent isocyanurate-compound (in relation to the solids content), namely a trimerization product of 4,4'-diphenyl-methane-diisocyanate, catalyzed with 2,4,6-tri-(dimethylaminoethyl)-phenol. The adhesive structures, obtained with Ingredients A and B were examined for their shear strength under thermal stress, after the adhesives which had been heated at 300°C. for different lengths of time had been cooled down. The results can be seen from the following Table II and clearly show the special technical stabilizing effect which is obtained according to the invention.

TABLE II

| | Shear strength in kp/cm$^2$ under thermal stress: | |
|---|---|---|
| Hours at 300°C. | Adhesive with Ingredient B, stabilized according to the invention | Comparative adhesive with Ingredient A |
| 0 | 75 | 75 |
| 3 | 68 | 60 |
| 6 | 60 | 50 |
| 9 | 55 | 45 |
| 15 | 42 | 25 |

EXAMPLE 3

A friction material was produced from the following constituents:

| | |
|---|---|
| Phenol-Novolak | 4.47% |
| cresol-resol | 6.93% |
| trimerization product+ | 3.32% |
| zinc oxide and/or aluminum silicate and/or calcium carbonate and/or barium sulphate | 36.56% |
| asbestos, shortfibers | 16.62% |
| asbestos, impregnated with polymer | 13.11% |
| graphite and/or molybdenum disulphide | 3.31% |
| premixture containing 20% acrylonitrile-butadiene-copolymer and usual fillers | 15.68% |

+The trimerization product was the reaction product of 4,4'-diphenyl-methane-diisocyanate trimerized with a mixture of tertiary phenolic amines.

The constituents were mixed dry in the usual way and then cold pressed into the desired shape under a pressure of 600 kp/cm$^2$, removed from the mold and subsequently hardened, whereby the hardening temperature rose in the course of about 10 hours to 190°C. as the final temperature. The final temperature was maintained for 5 hours. Hardening took place without any difficulties. Products were obtained which had the properties indicated in Table III.

For comparison, corresponding known friction materials were prepared under the same production conditions without the addition according to the invention of a trimerization product, but otherwise from the same constituents, and were then examined under the same conditions. Their properties are also indicated in Table III.

TABLE III

| Properties | Friction material according to the invention | for comparison |
| --- | --- | --- |
| Hardness+ | 1400 kp/cm² | 1800–2000 kp/cm² |
| Heat fading up to 400°C. | 35% | 50% |
| Heat fading up to 300°C. | 17.5% | 25% |
| Heat fading up to 250°C. | 12.5% | 22.5% |
| Speed fading V=20–80 km/h | 32.5% | 40% |
| Speed fading V=20–100 km/h | 40% | 55% |
| Speed fading V=20–120 km/h | 55% | 60% |
| Wear rate of brake linings after about 500 stops (Temperature in the region of 200°–500°C.) | 26.5 g per lining | 38.7 g |
| Wear rate of brake drums | no measurable wear no apparent attack | central scoring |

+According to DIN 53456 —ball-pressure hardness of plastics material.

This friction lining proved particularly suitable for truck brake drums, especially for heavy lorries, trailer vehicles and buses, for which in particular favorable heat stability and very good wearability are desired in the middle friction value range.

EXAMPLE 4

A friction material was produced from the following constituents:

| | |
| --- | --- |
| Phenol-Novolak | 2.00% |
| cresol-resol | 5.50% |
| trimerization product + | 2.50% |
| asbestos, short fibers | 10.00% |
| asbestos, long fibers | 10.00% |
| KNO₃ | 1.50% |
| Ca(OH)₂ | 1.50% |
| copolymer-premixture according to Example 3 | 50.00% |
| usual fillers, such as white cast iron and/or magnesium and/or aluminum and/or silicates | 17.00% |

The manufacture of the friction material took place as described in Example 3. A friction material which had been prepared in the same way but without the trimerization product+ which was a 4,4'-diphenyl-methane-diisocyanate trimerized with 2,4,6-tri-(dimethylaminoethyl)-phenol as the catalyst, was again examined for comparison. The properties obtained are apparent from the following Table IV.

TABLE IV

| Properties | Friction material according to the invention | for comparison |
| --- | --- | --- |
| Hardness+ | 1000 kp/cm² | 1800–2000 kp/cm² |
| Heat fading up to 350°C. | 36.5% | 50–60% |
| Heat fading up to 300°C. | 22.5% | 33.5% |
| Heat fading up to 250°C. | 12.5% | 12.5% |
| Speed fading V=20–60 km/h | 0% | 0–20% |
| Speed fading v=20–80 km/h | 12.5% | 15–30% |
| Speed fading v=20–100 km/h | 20% | 30–50% |
| Wear rate of brake linings | 30–50% | Improvement compared to known linings of comparable composition |
| Effect on the drum | no attack | scoring |

+According to DIN 53456 — ball-pressure hardness of plastics material.

This friction material was particularly suitable as brake drum linings for heavy lorries and buses for which sufficient thermostability, high resistance to wear and no attack on the contact material are demanded.

EXAMPLE 5

A friction material was manufactured from the following constituents:

| | |
| --- | --- |
| Phenol-Novolak | 6.58% |
| cresol-resol | 6.79% |
| trimerization product according to Example 3 | 6.63% |
| asbestos, short fibers | 20.00% |
| asbestos, long fibers | 20.00% |
| KNO₃ | 2.50% |
| Ca(OH)₂ | 2.00% |
| usual fillers according to Example 4 | 35.50% |

The manufacture of the friction material took place as described in Examples 3 and 4. Again for the purpose of comparison, a friction material which had been prepared in the same way but without the trimerization product was examined. The results are given in the following Table V.

TABLE V

| Properties | Friction material according to the invention | for comparison |
| --- | --- | --- |
| Hardness+ | 1600–2000 kp/cm² | 3000–4000 kp/cm² |
| Heat fading up to 250°C. | 2% | 0% |
| Heat fading up to 350°C. | 0–10% | 0–25% |
| Heat fading up to 450°C. | 10–25% | 20–50% |
| Improvement in the resistance to wear | 30–35% | |

+According to DIN 53456 — ball-pressure hardness of plastics material.

This friction material was particularly suitable as a heavy-duty lining for lorries and transport brake drums, for which high friction value, high thermostability and sufficient elasticity are demanded.

The results show that the temperature stability and the resistance to wear were quite considerably improved in the friction materials according to the invention, as compared with the known friction materials with organic binding agents.

It will be understood that the foregoing details are given for the purpose of illustration, not restriction, and that the invention is not limited to the specific formulas of composition illustrated, but may be embodied as well in other blends of compounds.

We claim:

1. A stabilized phenolic resin polymer consisting essentially of a cured blend of a phenolic resin polymer and a cross-linked polyisocyanurate compound characterized by the repeating group

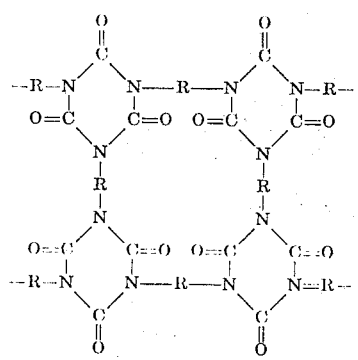

wherein R is a member selected from the group consisting of unsubstituted aryl, aryl substituted with halogen, aryl substituted with lower alkyl, and diphenylsulfonyl.

2. A polymer as claimed in claim 1, in which R is

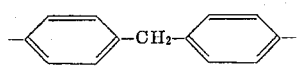

3. A stabilized polymer consisting essentially of a cured blend of a phenolic resin polymer and acrylonitrile-butadiene-copolymer and a cross-linked polyisocyanurate compound characterized by the repeating group

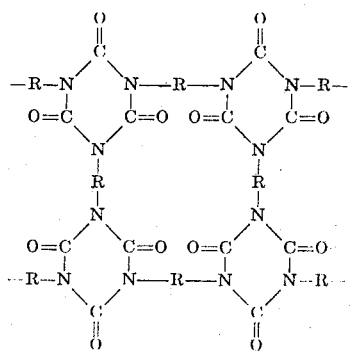

wherein R is

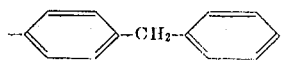

4. A friction material consisting essentially of a phenolic resin binder through which are dispersed fillers which impart thereto wear resistance and a desired coefficient of friction, and a dispersion of a cross-linked polyisocyanurate compound characterized by the repeating group

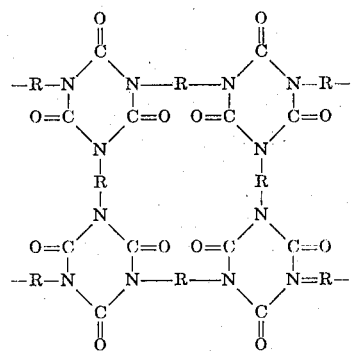

wherein R is a member selected from the group consisting of unsubstituted aryl, aryl substituted with halogen, aryl substituted with lower alkyl, and diphenylsulfonyl, in a proportion of said polyisocyanurate compound to said phenolic resin binder in the weight range of 1:1 to 1:10.

5. A friction material consisting essentially of, in approximate percentage by weight:

| | |
|---|---|
| phenol-Novolak polymeric resin | 4.47 |
| cresol-resol polymeric resin | 6.93 |
| 4,4'-diphenylmethane-diisocyanate trimerized with a mixture of tertiary phenolic amines | 3.32 |
| a member selected from the group consisting of zinc oxide, aluminum silicate, calcium carbonate, barium sulphate and a mixture thereof | 36.56 |
| asbestos, short fibers | 16.62 |
| asbestos, impregnated with a said polymeric resin | 13.11 |
| a member selected from the group consisting of graphite and molybdenum disulphide | 3.31 |
| premixture of 20% acrylonitrile-butadiene-copolymer and inorganic filler | 15.68 |

6. A friction material consisting essentially of, in approximate percentage by weight:

| | |
|---|---|
| phenol-Novolak | 2 |
| cresol-resol | 5.5 |
| 4,4'-diphenylmethane-diisocyanate trimerized with a mixture of tertiary phenolic amines | 2.5 |
| asbestos, short fibers | 10 |
| asbestos, long fibers | 10 |
| $KNO_3$ | 1.5 |
| $Ca(OH)_2$ | 1.5 |
| premixture of 20% acrylonitrile-butadiene-copolymer and inorganic filler | 50 |
| inorganic filler | 17 |

7. A friction material consisting essentially of, in approximate percentage by weight:

| | |
|---|---|
| phenol-Novolak | 6.58 |
| cresol-resol | 6.79 |
| 4,4'-diphenylmethane-diisocyanate trimerized with a mixture of tertiary phenolic amines | 6.63 |
| asbestos, short fibers | 20 |
| asbestos, long fibers | 20 |
| $KNO_3$ | 2.5 |
| $Ca(OH)_2$ | 2 |
| inorganic filler | 35.5 |

* * * * *